(12) United States Patent
Hall et al.

(10) Patent No.: US 10,387,151 B2
(45) Date of Patent: *Aug. 20, 2019

(54) PROCESSOR AND METHOD FOR TRACKING PROGRESS OF GATHERING/SCATTERING DATA ELEMENT PAIRS IN DIFFERENT CACHE MEMORY BANKS

(75) Inventors: Jonathan C. Hall, Hillsboro, OR (US); Sailesh Kottapalli, San Jose, CA (US); Andrew T. Forsyth, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 1329 days.

This patent is subject to a terminal disclaimer.

(21) Appl. No.: 13/250,223

(22) Filed: Sep. 30, 2011

(65) Prior Publication Data

US 2012/0144089 A1    Jun. 7, 2012

Related U.S. Application Data

(63) Continuation-in-part of application No. 12/644,440, filed on Dec. 22, 2009, now Pat. No. 8,447,962, and (Continued)

(51) Int. Cl.
*G06F 9/312* (2018.01)
*G06F 9/30* (2018.01)
(Continued)

(52) U.S. Cl.
CPC ...... *G06F 9/30043* (2013.01); *G06F 9/30018* (2013.01); *G06F 9/30036* (2013.01); (Continued)

(58) Field of Classification Search
CPC ............. G06F 9/30018; G06F 9/30036; G06F 9/30043; G06F 9/30101; G06F 12/06
See application file for complete search history.

(56) References Cited

U.S. PATENT DOCUMENTS 4,589,065 A    5/1986   Auslander et al.
4,881,168 A  * 11/1989  Inagami et al. ................ 712/5
(Continued)

*Primary Examiner* — David J. Huisman
(74) *Attorney, Agent, or Firm* — Nicholson De Vos Webster & Elliott LLP

(57) ABSTRACT

Methods and apparatus are disclosed for accessing multiple data cache lines for scatter/gather operations. Embodiment of apparatus may comprise address generation logic to generate an address from an index of a set of indices for each of a set of corresponding mask elements having a first value. Line or bank match ordering logic matches addresses in the same cache line or different banks, and orders an access sequence to permit a group of addresses in multiple cache lines and different banks. Address selection logic directs the group of addresses to corresponding different banks in a cache to access data elements in multiple cache lines corresponding to the group of addresses in a single access cycle. A disassembly/reassembly buffer orders the data elements according to their respective bank/register positions, and a gather/scatter finite state machine changes the values of corresponding mask elements from the first value to a second value.

12 Claims, 9 Drawing Sheets

Related U.S. Application Data a continuation-in-part of application No. 13/175,953, filed on Jul. 5, 2011, now Pat. No. 8,892,848, which is a continuation of application No. 11/967,482, filed on Dec. 31, 2007, now Pat. No. 7,984,273.

(51) Int. Cl.

| | | |
|---|---|---|
| *G06F 12/06* | (2006.01) | |
| *G06F 12/08* | (2016.01) | |
| *G06F 9/345* | (2018.01) | |

(52) U.S. Cl.
CPC ......... *G06F 9/30101* (2013.01); *G06F 9/345* (2013.01); *G06F 12/06* (2013.01); *G06F 12/08* (2013.01)

(56) References Cited

U.S. PATENT DOCUMENTS

| | | | | |
|---|---|---|---|---|
| 4,961,161 | A | | 10/1990 | Kojima |
| 5,182,811 | A | | 6/1993 | Sakamura |
| 5,504,925 | A | | 4/1996 | Jeffs |
| 5,511,210 | A | * | 4/1996 | Nishikawa et al. ............ 712/5 |
| 5,632,028 | A | | 5/1997 | Thusoo et al. |
| 5,640,524 | A | * | 6/1997 | Beard et al. ............ 712/222 |
| 5,673,426 | A | | 9/1997 | Shen et al. |
| 5,680,620 | A | | 10/1997 | Ross |
| 5,745,770 | A | | 4/1998 | Thangadurai et al. |
| 5,812,439 | A | | 9/1998 | Hansen |
| 5,878,245 | A | * | 3/1999 | Johnson et al. ............ 711/154 |
| 5,933,618 | A | | 8/1999 | Tran et al. |
| 5,966,529 | A | | 12/1999 | Sollars |
| 6,006,030 | A | | 12/1999 | Dockser |
| 6,044,454 | A | | 3/2000 | Schwarz et al. |
| 6,049,876 | A | | 4/2000 | Moughanni et al. |
| 6,131,158 | A | | 10/2000 | Malsuo et al. |
| 6,374,345 | B1 | | 4/2002 | Juffa et al. |
| 6,408,379 | B1 | | 6/2002 | Juffa et al. |
| 6,542,988 | B1 | | 4/2003 | Tremblay et al. |
| 6,615,343 | B1 | | 9/2003 | Talcott et al. |
| 6,675,292 | B2 | | 1/2004 | Prabhu et al. |
| 6,704,862 | B1 | | 3/2004 | Chaudhry et al. |
| 6,742,113 | B1 | | 5/2004 | Yamada |
| 6,795,937 | B2 | | 9/2004 | Harris et al. |
| 7,210,027 | B2 | | 4/2007 | Suzuki et al. |
| 7,216,218 | B2 | | 5/2007 | Wilson |
| 7,437,521 | B1 | * | 10/2008 | Scott et al. ............ 711/151 |
| 7,502,277 | B2 | | 3/2009 | Wu et al. |
| 7,707,393 | B2 | | 4/2010 | Wilson |
| 7,882,339 | B2 | | 2/2011 | Jacobson et al. |
| 7,966,480 | B2 | | 6/2011 | Catherwood |
| 7,984,273 | B2 | * | 7/2011 | Sprangle et al. ............ 712/4 |
| 8,108,652 | B1 | * | 1/2012 | Hui ............ 712/4 |
| 8,892,848 | B2 | * | 11/2014 | Sprangle et al. ............ 712/6 |
| 9,747,101 | B2 | * | 8/2017 | Ould-Ahmed-Vall ............ G06F 9/30043 |
| 2003/0074530 | A1 | | 4/2003 | Mahalingaiah et al. |
| 2004/0236920 | A1 | | 11/2004 | Sheaffer |
| 2006/0129740 | A1 | * | 6/2006 | Ruckerbauer et al. ............ 711/5 |
| 2009/0172364 | A1 | | 7/2009 | Sprangle et al. |

\* cited by examiner

PROCESSOR AND METHOD FOR TRACKING PROGRESS OF GATHERING/SCATTERING DATA ELEMENT PAIRS IN DIFFERENT CACHE MEMORY BANKS

RELATED APPLICATIONS

This application is a continuation-in-part of application Ser. No. 12/644,440, titled "GATHERING AND SCATTERING MULTIPLE DATA ELEMENTS," filed Dec. 22, 2009, now U.S. Pat. No. 8,447,962; and is also a continuation-in-part of application Ser. No. 13/175,953, titled "PROCESSOR AND SYSTEM USING A MASK REGISTER TO TRACK PROGRESS OF GATHERING AND PREFETCHING ELEMENTS FROM MEMORY," filed Jul. 5, 2011, now U.S. Pat. No. 8,892,848; which is a continuation of application Ser. No. 11/967,482, titled "SYSTEM AND METHOD FOR USING A MASK REGISTER TO TRACK PROGRESS OF GATHERING ELEMENTS FROM MEMORY," filed Dec. 31, 2007, now U.S. Pat. No. 7,984,273.

FIELD OF THE DISCLOSURE

This disclosure relates generally to the fields of computing and/or communications. In particular, the disclosure relates to accessing multiple data cache lines responsive to, and/or in support of scatter/gather operations.

BACKGROUND OF THE DISCLOSURE

Modern processors often include instructions to provide operations that are computationally intensive, but offer a high level of data parallelism that can be exploited through an efficient implementation using various data storage devices, such as for example, single instruction multiple data (SIMD) vector registers.

Vectorizing an application or software code may include changing the original source code of the application to make the application compile, install, and/or run on specific systems or instruction-set architectures, such as for example, a wide or large width vector architecture. For some applications, memory access may be complex, inconsistent, or noncontiguous, for example, as vector widths increase (e.g., for operations such as three dimensional (3D) image rendering). Memory used for vectorized processes may be stored in noncontiguous or non-adjacent memory locations. A number of architectures may require extra instructions which minimizes instruction throughput and significantly increase the number of clock cycles required to order data in the registers before performing any arithmetic operations.

Mechanisms for improving memory access and ordering data to and from wider vectors may include implementing gathering and scattering operations for generating local contiguous memory access for data from other non-local and/or noncontiguous memory locations. Gather operations may collect data from a set of noncontiguous or random memory locations in a storage device and combine the disparate data into a packed structure. Scatter operations may disperse elements in a packed structure to a set of noncontiguous or random memory locations. Some of these memory locations may not be cached, or may have been paged out of physical memory.

If gather operations are interrupted for a page fault or some other reason, with some architectures, the state of the machine may not be saved, requiring a repeat of the entire gather operation rather than a restart where the gather operation was interrupted. Since multiple memory accesses may be required on any gather operation, many clock cycles may be required for completion, for which any subsequent dependent arithmetic operations must necessarily wait. Such delays represent a bottleneck, which may limit performance advantages otherwise expected for example, from a wide or large width vector architecture.

Alternative mechanisms for improving memory access and ordering data to and from wider vectors may include causing parallel loads or stores of separated words to or from a data vector using different memory chips in a computer. Again, some of these memory locations may have been paged out of physical memory, and so the issues remain for restarting operations that are interrupted for a page fault or some other reason, but this time the loads or stores may be executing in parallel. Hence, resolving such faults in a correct order may be difficult or require serialization and all of the loads or stores may need to be completed prior to the resolving of such faults.

To date, potential solutions to such performance limiting issues and bottlenecks have not been adequately explored.

BRIEF DESCRIPTION OF THE DRAWINGS

The present invention is illustrated by way of example and not limitation in the figures of the accompanying drawings.

DETAILED DESCRIPTION

Figure 1:
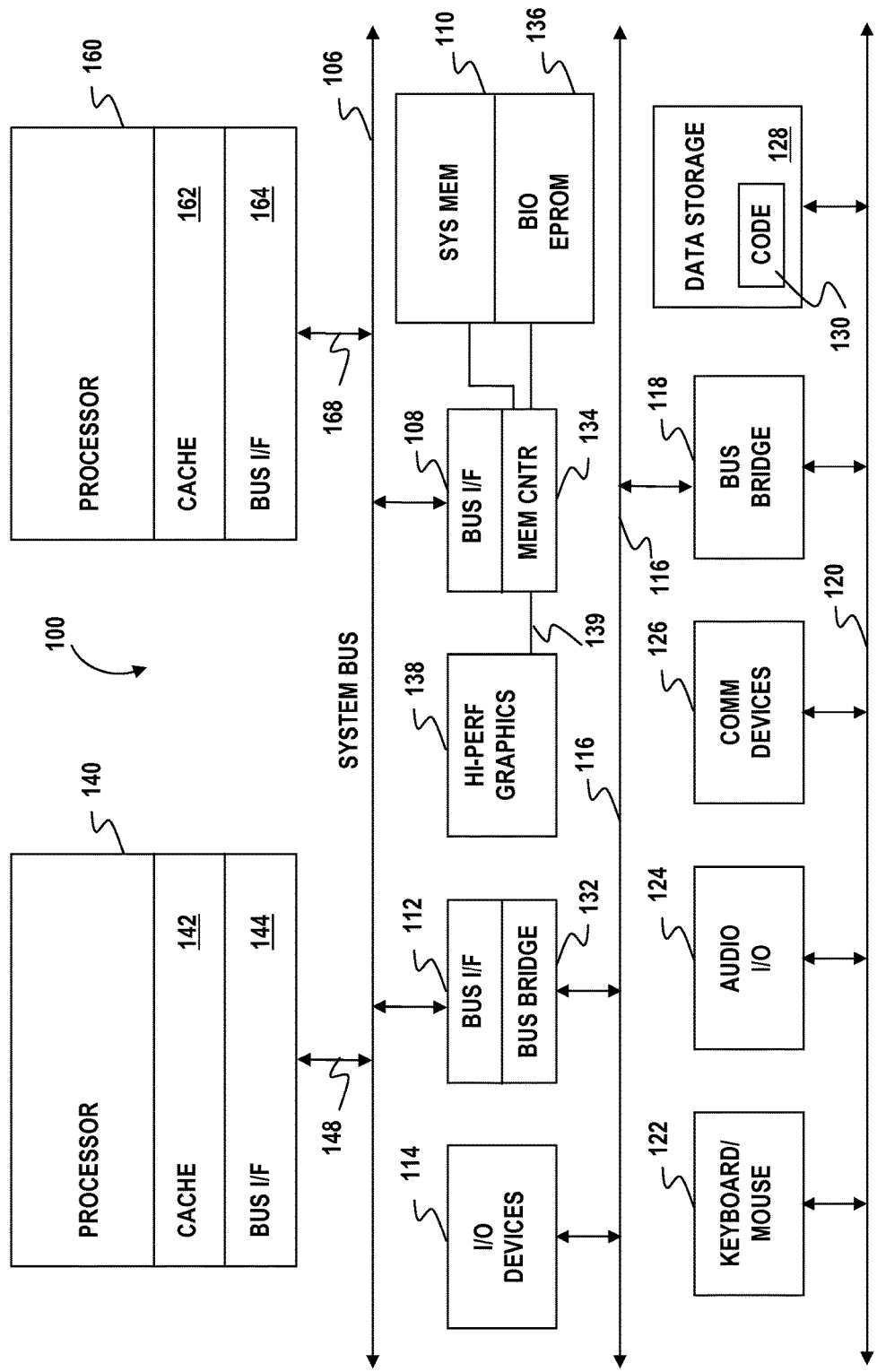
FIG. 1 illustrates one embodiment of a computing system for accessing multiple data cache lines responsive to, and/or in support of scatter and/or gather operations.

Gather and scatter operations rearrange stored data elements for use by SIMD hardware. Gather operations read a set of data elements from memory and pack them together, typically into a single register or cache line. Scatter operations perform the reverse operation by dispersing data elements in a packed data structure to a set of non-contiguous or random memory locations. In addition to the delays associated with accessing one or more levels of memory, interruptions during the gather or scatter operations, e.g., due to repeated page faults, may significantly increase the overhead associated with these operations since any progress made by the operation is typically discarded prior to returning to the beginning of the operation. U.S. Pat. App. No. 2009/0172364, portions of which have been incorporated herein, discloses gather, scatter, and prefetch implementations which, when interrupted, may save the state of the operation. Thus, when the operation is restarted, a repeat of the entire operation may not be required.

Novel methods and apparatus are also disclosed for accessing multiple data cache lines for scatter and/or gather operations without requiring additional cache ports. Embodiment of apparatus may comprise address generation logic to generate an address, from an index of a set of indices, for each of a set of corresponding mask elements having a first value indicating which corresponding data elements need to be scattered to, or gathered from memory. Line or bank match ordering logic matches up addresses in the same cache line or in different cache banks, and orders an access sequence to permit a grouping of addresses in multiple cache lines and different banks. Address selection logic directs the groups of addresses to their corresponding different banks in a cache to access data elements in multiple cache lines, corresponding to the group of addresses, in a single cache access cycle. A disassembly/reassembly buffer orders the data elements, according to their corresponding different banks in the cache for scatter operations, and according to positions of their corresponding indices in an index vector for gather operations. A gather/scatter finite state machine changes the values of corresponding mask elements from the first value to a second value upon successful completion of a corresponding load or store. It will be appreciated that by permitting access to different banks in multiple data cache lines responsive to, and/or in support of scatter and/or gather operations, instruction throughput may be improved.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 2:
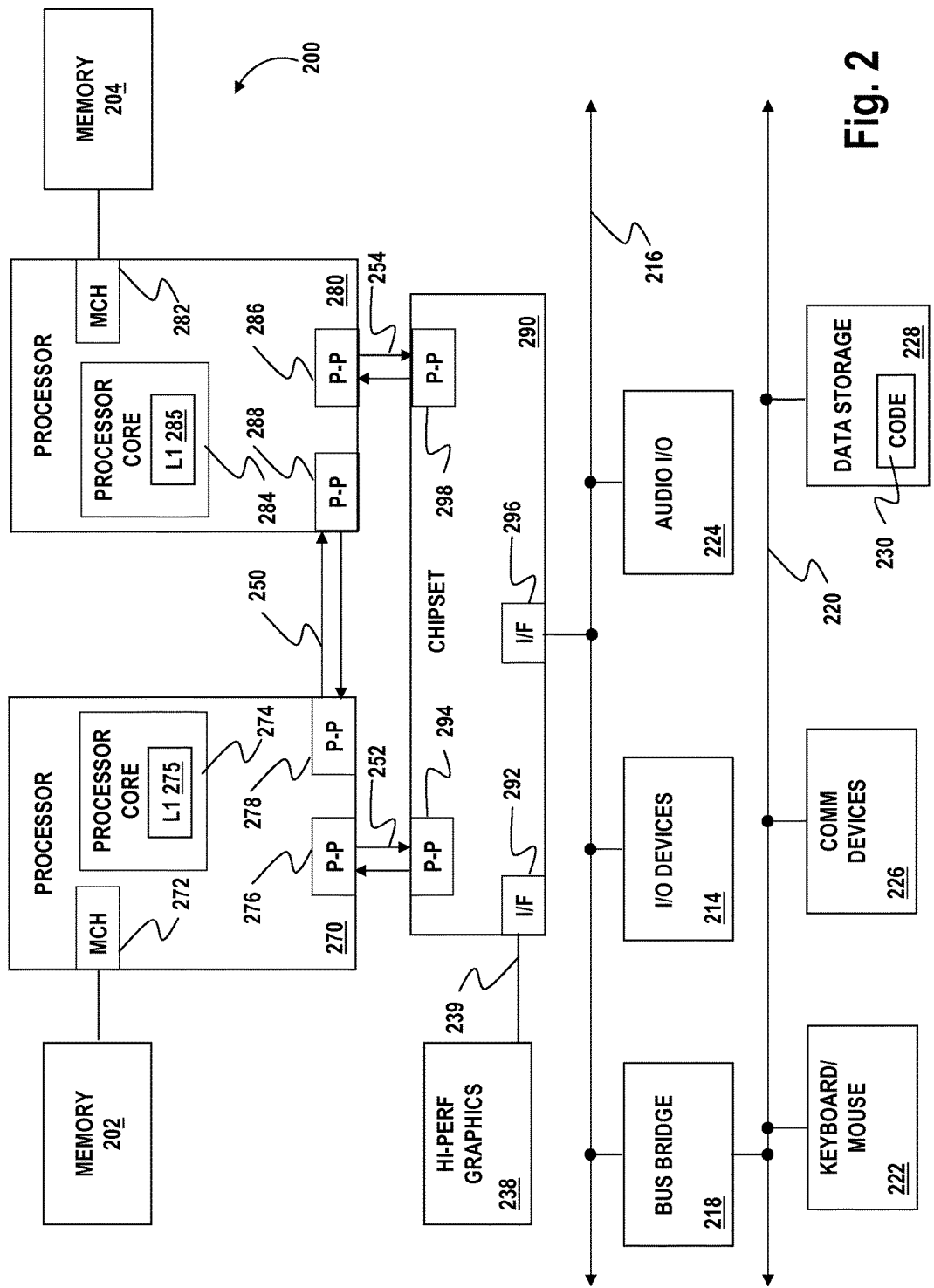
FIG. 2 illustrates an alternative embodiment of a computing system for accessing multiple data cache lines responsive to, and/or in support of scatter and/or gather operations.

FIG. 1 illustrates one embodiment of a computing system 100 for accessing multiple data cache lines responsive to, and/or in support of scatter and/or gather operations. The system in FIG. 1 shows a system 100 where processors, memory, and input/output devices are interconnected by a front side bus and/or a system bus, whereas system in FIG. 2 shows a system 200 were processors, memory, and input/output devices are interconnected by a number of point-to-point interfaces. Other processor architectures may be used, and other methods of communicating data within a processor may be used. Other numbers of processors than those shown may be used, such as a single processor.

Referring particularly to FIG. 1, system 100 includes two processors 140 and 160 operable to perform a transfer operation for a plurality of data elements between a first and second storage location (e.g., vscatter, vgather, vscatterpf, and vgatherpf). Although only two are shown for clarity, system 100 can include more than two or only one processor. Processors 140 and 160 include level one (L1) caches 142, 162, provided for gathering or scattering data. In some embodiments, processors 140 and 160 are coupled to corresponding level two (L2) caches via a backside bus. The system in FIG. 1 has several functional units connected via bus interfaces 144, 164, 112, 108 via a system bus 106. In one embodiment, system bus 106 may be the front side bus (FSB) as used with Pentium® class microprocessors manufactured by Intel® Corporation. In other embodiments, other buses may be used.

In some implementations, other components perform gather, scatter, and/or prefetch operations between a first and second set of storage locations. For example, the system 100 includes a memory controller 134 that permits processors 140, 160 to read write, gather and/or scatter data to and from system memory 110. In some implementations, other components perform functions, such as gather functions, and other internal and external memories may be used. Other embodiments include a basic input/output system (BIOS) erasable programmable read-only memory (EPROM) 136 using flash memory. Memory controller 134 includes a bus interface 108 to permit memory read and write data to be carried to and from functional units coupled to the system bus 106. Memory controller 134 may also connect with a high-performance graphics circuit 138 across a high-performance graphics interface 139. In certain embodiments the high-performance graphics interface 139 may be an advanced graphics port AGP interface. Memory controller 134 may direct read data from system memory 110 to the high-performance graphics circuit 138 across high-performance graphics interface 139. In the FIG. 1 system 100, bus bridge 132 may permit data exchanges between system bus 106 and bus 116, which may in some embodiments be an industry-standard architecture (ISA) bus or a peripheral component interconnect (PCI) bus.

FIG. 2 illustrates an alternative embodiment of a computing system 200 for accessing multiple data cache lines responsive to, and/or in support of scatter and/or gather operations. The system 200 in FIG. 2 may also include several processors, of which only two, processors 270, 280 are shown for clarity. Processor cores 274 and 284 of processors 270 and 280, respectively include L1 caches 275 and 285, provided for gathering or scattering data. In some embodiments, processors 270 and 280 are also coupled to corresponding L2 cache(s). Processors 270, 280 each include a local memory channel hub (MCH) 272, 282 to connect with memory 202, 204, for gathering and/or scattering data. Processors 270, 280 exchange data via a point-to-point interface 250 using point-to-point interface circuits 278, 288. Processors 270, 280 each exchange data with a chipset 290 via individual point-to-point interfaces 252, 254 using point to point interface circuits 276, 294, 286, 298. Chipset 290 may also exchange data with a high-performance graphics circuit 238 via a high-performance graphics interface 292.

In the FIG. 2 system 200, chipset 290 may exchange data with a bus 216 via a bus interface 296. In either system, there may be various input/output I/O devices 214 (114) on the bus 216 (116). Another bus bridge 218 (118) may in some embodiments be used to permit data exchanges between bus 216 (116) and bus 220 (120). Bus 220 (120) may in some embodiments be a small computer system interface (SCSI) bus, an integrated drive electronics (IDE) bus, or a universal serial bus (USB) bus. Additional I/O devices may be connected with bus 220 (120). These may include for example keyboard and cursor control devices 222 (122), including mice, audio I/O 224 (124), communications devices 226 (126), including modems and network interfaces, and data storage devices 228 (128). Software code 230 (130) may be stored on data storage device 228 (128). In some embodiments, data storage device 228 (128) may be a fixed magnetic disk, a floppy disk drive, an optical disk drive, a magneto-optical disk drive, a magnetic tape, or non-volatile memory including flash memory.

Embodiments of the invention may include a computer readable medium, such as for example a memory, a disk drive, or a universal serial bus (USB) flash memory, or the various storage and memory devices shown in FIGS. 1 and 2, including or having stored thereon instructions which when executed by a processor or controller, carry out methods disclosed herein.

Figure 3:
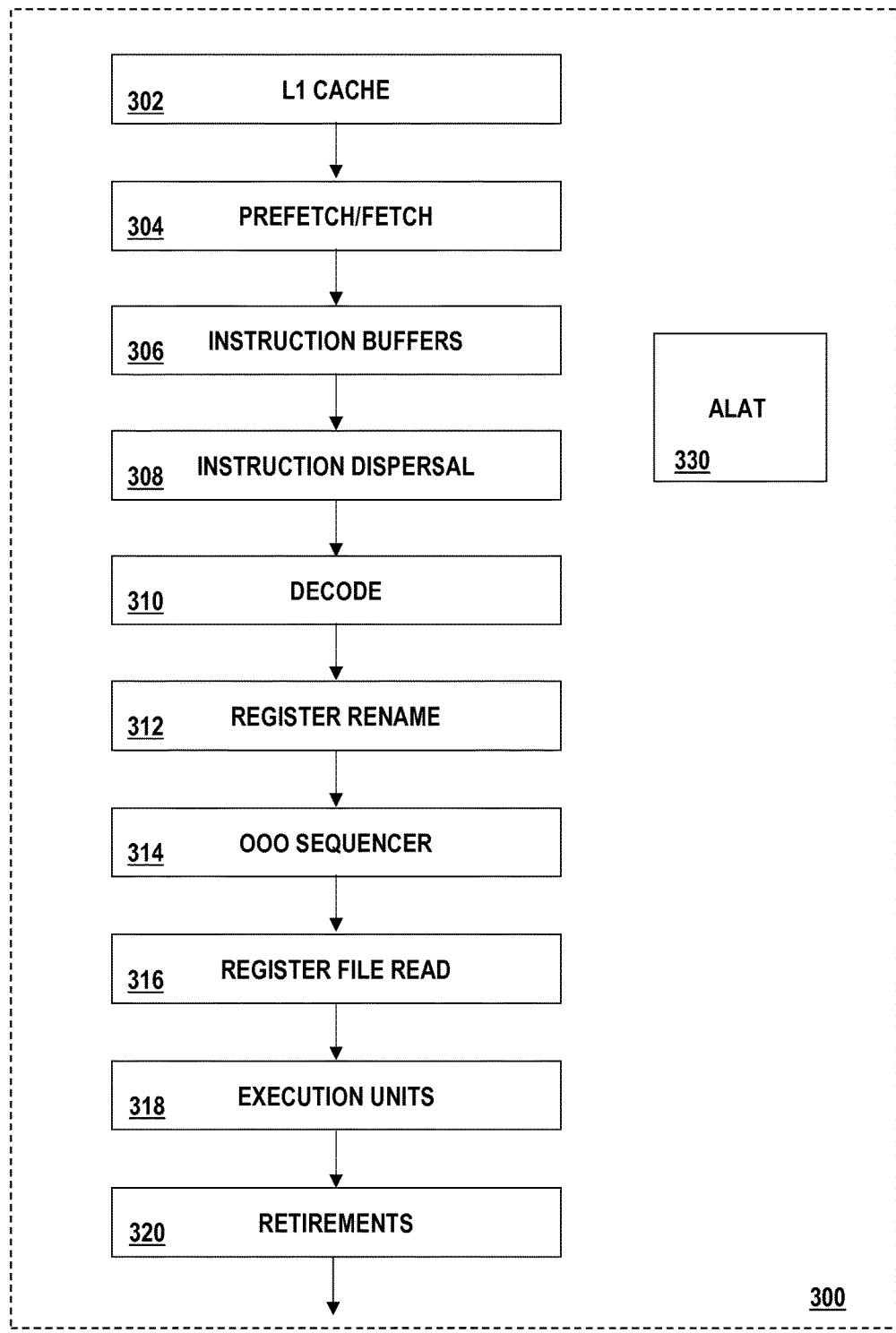
FIG. 3 illustrates a block diagram for one embodiment of stages in a processor pipeline for accessing multiple data cache lines responsive to, and/or in support of scatter and/or gather operations.

FIG. 3 illustrates a block diagram for one embodiment of stages in a processor pipeline for accessing multiple data cache lines responsive to, and/or in support of scatter and/or gather operations. Processor pipeline 300 may be operated by the processors of FIG. 1 or 2, or other processors according to embodiments of the invention. Processor pipeline 300 may be an out-of order pipeline. Other pipeline components or mechanisms may be used.

A level one (L1) cache stage 302 may store instructions and/or data in a level one (L1) cache (142, 162 in FIG. 1, or 275, 285 in FIG. 2). A prefetch/fetch stage 304 may fetch and/or prefetch the instructions from the level one (L1) cache or another location. An instruction buffers stage 306 may temporarily keep or buffer the instructions in one or more buffers. An instruction dispersal stage 308 may send the instructions down the pipeline. A decode stage 310 may take an instruction from a program and produce one or more machine instructions. A register rename stage 312 may map logical registers over to actual physical registers prior to execution. An out-of-order (OOO) sequencer stage 314 may schedule the various machine instructions for execution, for example, based upon the availability of data, for example, in source registers. Those instructions whose source registers are waiting for data may have their execution postponed, whereas other instructions whose source registers have their data available may have their execution advanced in order. In some embodiments, they may be scheduled for execution in parallel.

A register file read stage 316 may read the physical (e.g., source) registers. An execution units stage 318 may input the machine instructions into one or more execution units. The advanced load address table (ALAT) stage 330 may modify entries while executing machine instructions, such as, advanced load instructions, corresponding test instructions, and any intervening store instructions. A retirements stage 320 may update the machine state and write to physical destination registers.

The pipeline stages shown in FIG. 3 are one example only, and may vary in both function and sequence in various processor pipeline embodiments. A processor used with embodiments of the invention need not use pipelining.

Figure 4:
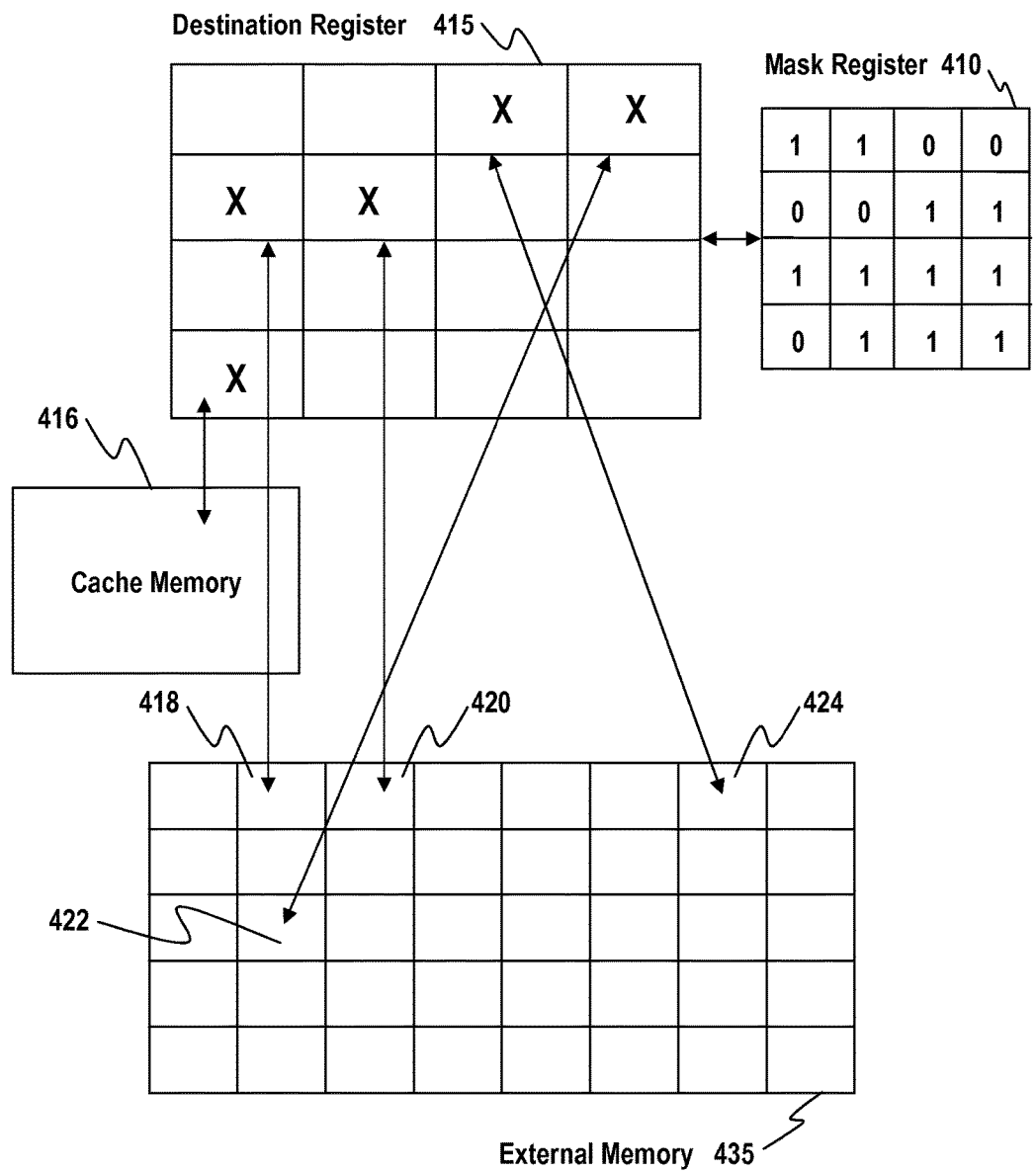
FIG. 4 is a schematic illustration of the flow of data in a system to support scatter and/or gather operations.

FIG. 4 is a schematic illustration of the flow of data in a system to support scatter and/or gather operations. Data may be stored in a system (e.g., such as systems described herein in reference to FIGS. 1 and 2) in cache memory 416 and/or external memory 435. Data may be gathered from contiguous locations 418 and 420 and/or non-contiguous or non-adjacent locations 422 and 424 (e.g., in external memory 435). Cache memory 416 is typically internal to a processor and external memory 435 is typically external to a processor (e.g., processors 140, 160, 270, and/or 280, each described in reference to one of FIGS. 1 and 2). However, in various embodiments, each of cache memory 416 and/or external memory 435 may be internal or external to a processor. External memory 435 may include or be analogous to, for example, 202, 204, 110 or other memories.

Cache memory 416 and/or external memory 435 may include, for example, random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Cache memory 416 may include data duplicating original values stored elsewhere or computed earlier, where the original data may be relatively more expensive to fetch (e.g., due to longer access time) or to compute, compared to the cost of reading the cache memory 416. Cache memory 416 may include pages, memory lines, or other suitable structures. Additional or other suitable memory may be used.

A gather operation may read data from two or more of non-contiguous memory locations 422 and 424 (e.g., in external memory 435) and write the data contiguously to a register memory, such as destination register 415. The status of the gathering of the data to destination register 415 may be recorded or written to a mask register 410. Register memories (e.g., destination, mask and/or other register memories) may be relatively small storage spaces typically within a processor. The contents of register memories may be accessed more quickly than storage placed elsewhere. Destination register 415 (e.g., a load register) may be for example, a counter machine, a pointer machine, a random access machine (RAM), a random access stored program machine model (RASP) or other memories. Mask register 410 (e.g., a shadow register) may have data fields, elements, or placeholders, holding for example '0' and '1' flags or values, shadowing or tracking the state or storage capacity of destination register 415.

Gather and scatter operations may be implemented to access data elements, particularly in applications having widely dispersed data elements. The dispersed data elements may be gathered for storing in a contiguous manner or in a single location, for example, in destination register 415 and/or scattered to two or more non-contiguous memory locations. In one embodiment, a gather instruction reads, copies, replicates, transfers, or contiguously writes each data element from two or more non-contiguous memory locations 422 and 424 (e.g., in cache memory 416 and/or external memory 435) to destination register 415, and vice versa with regard to the scatter instruction. Such gather processes are referred to as "packing" data elements and/or "packing" destination register 415. By packing data elements into a single location (e.g., destination register 415), a processor (e.g., FIGS. 1 and 2) may load, process, monitor or otherwise use the data collectively, simultaneously, in unison, and/or in sequence for executing operations on the data in a minimal number of cycles (e.g., one cycle).

Gather and/or scatter operations may be interrupted, possibly because the non-contiguous data delays the progress of the operation. In some embodiments, the state of the gather operation may be saved. Thus, when the gather operation is restarted, a repeat of the entire gather operation may not be required. Storing a record of which data elements have been and have not been gathered in for example register 410, may allow a restart of the gather instruction where the gather operation was interrupted.

In some embodiments, the gather operation may gather (e.g., read or access) each of a set of (e.g., 16) data elements from a two or more contiguous or non-contiguous memory locations in cache memory 416 and/or external memory 435. A gather operation may use as an input or may include a pointer to a memory page in cache memory 416. When data is spread across a boundary of a memory page, or no page memory address is provided, the gather operation may retrieve the data from external memory 435 which may take a relatively long time. In one embodiment, for each data element, the gather operation may first be pointed to cache memory 416 and if the gather is unsuccessful, may proceed to access the data from external memory 435.

The gather operation may store or pack data elements into destination register 415 (e.g., a load register). In one embodiment, destination register 415 may include multiple (e.g., 16) separate data elements, for example, used for a single gather operation. The data elements or vectors in destination register 415 may include data copied from the memory from which the data element was retrieved and/or pointers to the memory location from which the data element was retrieved. In some embodiments, the gather operation may access cache memory 416, local memory or memory internal to a processor to read or retrieve each data element before accessing external memory 435. The data elements may be arranged in cache memory 416, for example, in memory pages or other units of a memory. The data elements may be packed in memory (e.g., in contiguous memory locations 418 and 420) or alternately they may be stored in non-contiguous or non-adjacent locations (e.g., in non-contiguous memory locations 422 and 424). Typically the gather operation is used when the two or more of the data elements are stored in noncontiguous or non-adjacent memory locations 422 and 424. Data elements may be bytes (e.g., 8 bits), words (e.g., 2 bytes), double words (e.g., 32 bits) or other sizes or units of data.

The rate of a gather (or scatter) operation may depend, in part, on a level of coherence of the gathered (or scattered) elements. For example, the level of coherence of the gathered elements may be a measure of on how many different cache lines in which the data elements are stored, for example, in cache memory 416. Elements stored with greater coherence (e.g., stored using fewer cache lines in cache memory 416) may be gathered or retrieved in less time or in fewer operational cycles. For example, when all the data elements are fully coherent (e.g., on the same cache line), the gather operation may retrieve the data in a single cycle, or at least a single cache access. However, gathered elements may not be fully coherent. For example, the elements may be dispersed on several (e.g., 2 or 3) cache lines, and therefore may be gathered in several (e.g., 2 or 3) accesses to (e.g., the level 1 (L1) or central processing unit (CPU)) cache memory 416.

In some embodiments of cache memory 416, cache lines in which the data elements are stored may comprise multiple banks or blocks, for example, eight or sixteen banks could each store 64-bits of data for a 64-byte or a 128-byte cache line respectively. Of course, each bank could store less (e.g. 32-bits) or more (128-bits) data, and each cache line could have less or more banks or blocks (e.g. 4, 12, 20, 32, 48, etc.). The rate of a gather (or scatter) operation may also depend, in part, on the degree to which the gathered (or scattered) elements are stored in non-conflicting banks of cache memory 416. For some embodiments of cache memory 416, multiple cache lines may be accessed at the same time. In particular, when data from two or more cache lines is stored in non-conflicting banks or blocks of cache memory 416, then the data elements from two or more cache lines may also be gathered or retrieved in less time or in fewer operational cycles. Thus, if all the data elements are either coherent (e.g., on the same cache line) and/or stored in non-conflicting banks, the gather operation may conceivably retrieve the data in a single cycle, or at least a single cache access.

Destination register 415 may be a vector register, load register or other register memory for temporarily storing or packing data accessed or gathered from two or more non-adjacent memory locations. For example, for a set of data (e.g., 16 vectors), destination register 415 may be the destination of a gather operation and cache memory 416 and/or external memory 435 may be the sources (e.g., which may be contiguous 418 and 420 or non-contiguous 422 and 424).

In one embodiment, when a gather operation for gathering a predetermined set of data is terminated before completion, destination register 415 may temporarily store or preserve the data already collected (e.g., a partial subset of the predetermined set of data).

The gather operation may stop or interrupt for a variety of reasons. For example, a context switching device may switch register contexts, task contexts, or process contexts (e.g., for changing a state or context of a processor between two or more of multiple tasks). In another embodiment, the gather operation may stop or interrupt when one or more precise exceptions substantially impedes or slows down the gather operation (e.g., a maximal number or limit of allowable page faults or cache page misses for an operating system (OS) may be encountered) and/or the time allotted to the gather operation expires. In yet another embodiment, the gather operation may stop or interrupt when the gather operation is replaced by a higher priority operation.

A gather operation may be impeded, for example, when attempting to retrieve data from problematic memory locations in a system resulting in page faults. Some fault conditions such as page faults must be handled so that the program flow is capable of resuming the faulting instruction (e.g., retrieving the data) while guaranteeing forward progress of a corresponding set of instructions. In one embodiment, a memory page may include a fixed length block of cache memory 416 that is used as a unit of transfer between destination register 415 and other memories, such as, external memory 435, a hard-drive or disk. A page fault may include an interrupt (e.g., or an exception), for example, when a gather operation accesses a memory page that may be mapped in address space, but not physically loaded or available in cache memory 416. For example, each data element being gathered from cache memory 416 may cause a page fault and each element that crosses a boundary of a memory page may cause two page faults.

In one embodiment, a system may stop or interrupt the gather operation, for example, when a maximal number of allowable exceptions, such as, (e.g., 16) page faults are encountered. For example, the OS may have a limit for cache and/or page misses or faults for an operation. The OS may include exception handling software to handle the page faults and a processor may include a memory management unit for detecting page faults. Other exception handling mechanisms may be used.

In one embodiment, when a page fault is encountered, a system may stop the gather operation in the middle in order to handle the page fault. For example, if page faults are repeatedly encountered, the gather operation may be unable to progress. Conventionally, when the gather operation is stopped or interrupted, a partial subset of data elements already gathered may be lost and the process may rollback or return to the beginning of the gather operation.

Storing data gathered from cache memory 416 and/or external memory 435 in destination register 415 may preserve the data, for example, in case the complete gather operation (e.g., gathering all 16 vectors) is interrupted, fails or terminates before completion. According to embodiments of the invention, by storing data elements that have been gathered in destination register 415, the data previously collected by an interrupted or stopped gather operation may be preserved and the gather operation may restart in the middle. The interrupted gather operation (e.g., having gathered one or more data elements) may start from the middle, for example, gathering the remaining elements missing from destination register 415.

An efficient gather operation may be implemented in a system using a combination of software and/or hardware mechanisms. In one embodiment, a processor may execute a "gather_step" instruction repeatedly, for example, until a predetermined set of data has been completely gathered into destination vector register memory 415.

In some embodiments, mask register 410 may be implemented to monitor and/or control the gathering of a predetermined set of data elements and the packing of destination register 415 therewith. Mask register 410 may be a shadow register, a control register, a flag register or other appropriate register. Mask register 410 may track the completion of the gather operation by monitoring the data stored in destination register 415. In one embodiment, there is a one-to-one correspondence between data elements stored in destination register 415 and corresponding state elements stored in mask register 410. State elements or values may include flags, markers, tabs, indicators, signals, and or other numbers, bits and/or codes for indicating whether of not a corresponding data element (e.g., in a corresponding or pointed register location) is stored in destination register 415. For example, a "1" in mask register 410 may indicate that a corresponding data element was not written into destination register 415; otherwise a "0" may be used. Other numbers or flags may be used.

In one embodiment, a processor may call or execute the gather step instruction, for example, in a 'while' loop or repeating 'if' statement, until mask register 410 may be completely cleared (e.g., all state elements therein holding '0' values and the total value of mask register 410 may become zero), which may indicate that substantially all elements were successfully gathered from memory and loaded into destination register 415. In one embodiment, the gather step instruction may execute or run until the total value of the register state elements is zero.

Since a filled or packed destination register 415 of any size (e.g., for any number of gathered elements or instructions) may correspond to an empty or zero mask register 410 (e.g., regardless of the size of destination register 415), mask register 410 may be used to monitor the packing of any size destination register 415 (e.g., with any number of gathered elements). For example, the total sum of any number of "0" state elements will always be zero. Thus, mask register 410 may be used to monitor the packing or gathering of any, variable, and/or changing numbers of data elements into destination register 415. Other values may be used.

For example, in an alternate embodiment, a "1" in mask register 410 may indicate that a corresponding data element is written into destination register 415; otherwise a "0" may be used. In such embodiments, the gather instruction may execute until the sum of the values of the state elements in mask register 410 is equal to a predetermined threshold, for example, the number of data elements to be gathered, which may vary for each gather instruction.

In one embodiment, the gather step instruction may execute or run until a flag indicates that mask register 410 is cleared, zero, or another predetermined value (e.g., the number of elements to be gathered for the gather instruction). In one embodiment, a completion mask may signal or flag when the gather operation is complete.

In one embodiment, in each operation cycle, the "gather_step" instruction may read a different one of the cache lines from (e.g., L1) cache memory 416 and may fill a maximum number of elements in destination register 415 corresponding to the cache line read. For example, if the cache line read has one element to be gathered, then one element may be written into destination register 415 and the corresponding one bit state elements in mask register 410 may be set to "0". In some embodiments, when dual or multiple ported cache memory 416 and/or external memory 435 are used, a processor may scatter and/or gather more than one data element per cycle, in which case the scatter and/or gather operation for scattering and/or gathering a predetermined set of data elements may execute in fewer cycles or iterations. It will be also appreciated that by permitting access to different cache banks in multiple data cache lines, as is described in greater detail below with regard to FIGS. 7, 9 and 10, a processor may also scatter and/or gather more than one data element per cycle without requiring a dual or multiple ported cache memory 416.

Figure 5:
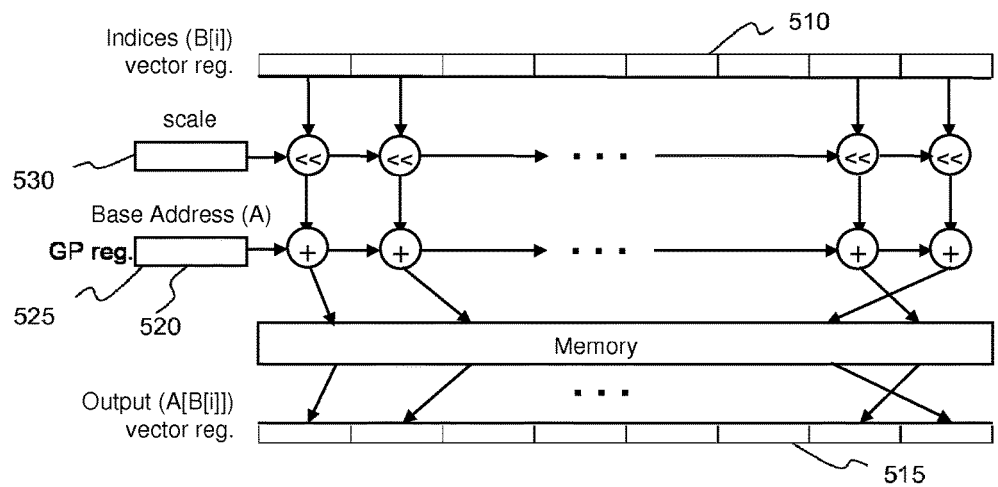
FIG. 5 illustrates one embodiment of a gather instruction that conditionally loads a set of elements into a destination SIMD register.

FIG. 5 illustrates one embodiment in which a gather instruction conditionally loads a set of data elements (e.g., up to sixteen 32-bit or eight 64-bit floating-point data elements for 512-bit SIMD) and packs them into a destination register 515. The elements are specified via a base address 520 passed in a general-purpose register 525, a scale 530 passed as an immediate, an index register 510 passed as a SIMD register (holding packed indices), and an optional displacement (not shown). Data elements will only be loaded if their corresponding mask bit is one. The mask register in this implementation is a dedicated mask register, alternatively the mask register may be a SIMD register, and the mask bit for an element is the sign bit of the corresponding element from the mask register. Mask elements are treated as the same size as index elements. If an element's mask bit is not set, the corresponding element of the destination register (a SIMD register) is left unchanged. Upon completion of the gather operation, the entire mask register is set to zero by the gather instruction unless its execution is interrupted by an exception.

In one embodiment, when a gather operation for gathering a predetermined set of data is terminated before completion, destination register 515 temporarily stores or preserves the data already collected (e.g., a partial subset of the predetermined set of data).

The following pseudo-code includes demonstrative examples of operations described herein. Other pseudo-code, languages, operations, orders of operations, and/or numbers may be used.

The following pseudo-code illustrates an example of how a gather instruction (e.g., written 'vgatherd') may operate.

Define a vgatherd instruction as follows:

```
vgatherd vector_dest{mask}, vector_offset, [base_address]
vector_dest is a vector register containing the result
mask is a 16-bit mask register used to track the progress of the
vector-gather operation
base_address is the base memory address
vector_offset is a vector register that contains a vector of offsets
from the base_address
  // Initialize the array of addresses
  for(i=0; i < 16 ; i++)
  {
    memPtr[i] = base_address + vector_offset[i];
  }
  bool bFirst = 1;
  UINT64 BaseCacheLine = 0;
  for(i=0; i < 16 ; i++)
  {
    if (mask[i] == 1)
    {
      thisCacheLine = memPtr[i] & 0xffffffffffffffC0;
      if( bFirst || (BaseCacheLine == thisCacheLine ))
      {
        BaseCacheLine = thisCacheLine;
        bFirst = 0;
        vector_dest[i] = LOAD_FROM_MEMORY(memPtr[i]);
        // 32-bits
        // reset mask bit
        mask[i] = 0;
      }
    }
  }
```

The following assembly code illustrates an example of how to use an iterative gather-step instruction (vgatherd) to implement a full vector-gather function, according to one embodiment.

```
The (vkxnor k1, k2) instruction implements the following function:
k1 = k1 XNOR k2
The (vkortest k1, k2) instruction writes the integer flags as follows.
zero_flag = ((k1 OR k2) == 0) // is the "or" of k1 and k2 equal to zero
carry_flag = ((k1 OR k2) == 0xFFFF) // is the "or" of k1 and k2
equal to all 1's
The "jnz" instruction is a standard x86 jump-if-not-zero branch.
;-----------------------------------------------------------------------
; K1 = ffff;
    vkxnor k1, k1        ; init the completion mask
vg_loop:
    vgatherd v1{k1}, v2, [eax]    ; v1 = dest
                                  ; k1 = completion mask
                                  ; v2 = address offset vector
                                  ; eax = base address
    vkortest k1, k1
    jnz vg_loop
```

Figure 6:
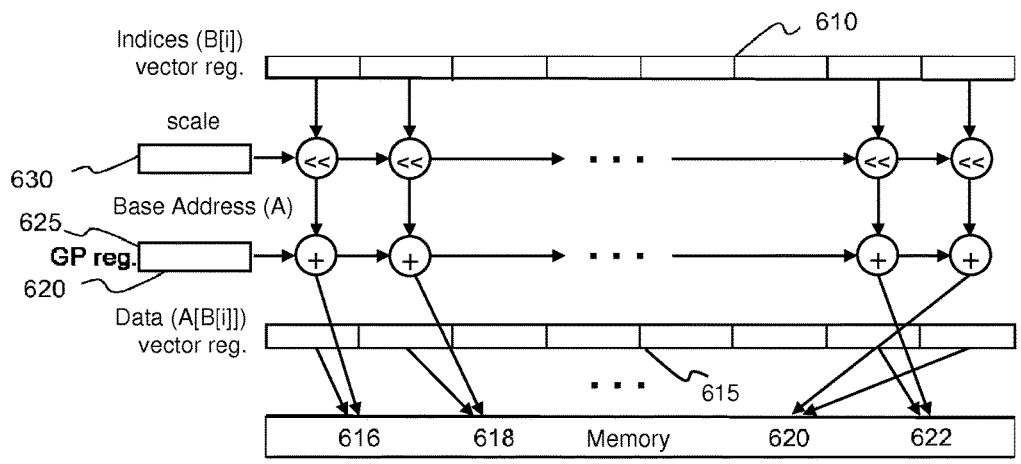
FIG. 6 illustrates one embodiment of a scatter instruction that conditionally stores a set of elements from a source SIMD register.

FIG. 6 illustrates one embodiment in which a scatter instruction conditionally stores a set of elements from a source SIMD register 615, ordering writes to any overlapping destination memory locations from LSB to MSB of the source. The destination memory locations 616, 618, 620, and 622 are specified as described above for the gather instruction. Elements will only be stored if their corresponding mask bit is one. The entire mask register will be set to zero by execution of the gather instruction unless the gather instruction triggers an exception. This instruction can be suspended by an exception if at least one element is already scattered (just as the gather instruction above). In some implementations, only writes to overlapping destination locations are guaranteed to be ordered with respect to each other (from LSB to MSB of the source registers). Overlap is determined as follows. Each element corresponds to a set of byte-sized locations, [(index*scale):(index*scale+data element size-1)]. If any two locations from two different elements are the same, the elements overlap. Writes that are not overlapped may occur in any order. In some embodiments, if two or more destination locations completely overlap, the "earlier" write(s) may be skipped. In some implementations, elements may be scattered in any order (if there is no overlap), but faults must be delivered in a right-to-left order.

The following pseudo-code illustrates one embodiment of a scatter instruction (written here 'vscatterd').

Define a vscatterd instruction as follows:

```
vscatterd [base_address]{mask}, vector_offset, vector_scatter_data
base_address is the base memory address
mask is a 16-bit mask register used to track the progress of the
vector-gather operation
vector_offset is a vector register that contains a vector of offsets from
the base_address
vector_scatter_dest is a vector register containing the data to be
scattered to memory
  // Initialize the array of addresses
  for(i=0; i < 16 ; i++)
  {
    memPtr[i] = base_address + vector_offset[i];
  }
  bool bFirst = 1;
  UINT64 BaseCacheLine = 0;
  for(i=0; i < 16 ; i++)
  {
    If (mask[i] == 1)
    {
      UINT64 thisCacheLine = memPtr[i] & 0xffffffffffffffC0;
      if( bFirst || (BaseCacheLine == thisCacheLine ))
      {
        BaseCacheLine = thisCacheLine;
        bFirst = 0;
        // Store to memory 32 bits of vector_scatter_data[i] to
        location memPtr[i]
        STORE_TO_MEMORY(memPtr[i],vector_scatter_data[i]);
        // reset mask bit
        mask[i] = 0;
      }
    }
  }
```

The following assembly code illustrates one example an iterative scatter-step instruction (vscatterd) implementing a full vector-scatter function.

```
;-----------------------------------------------------------------------
vs_loop:
    vscatterd [eax]{k1}, v2, v3 ; v3 = vector of scatter data
                                ; k1 = completion mask
                                ; v2 = address offset vector
                                ; eax = base address
    vkortest k7, k7
    jnz vs_loop
```

Referring again to FIG. 4, a scatter/gather prefetch instruction may be defined similarly to the vgatherd instruction, but instead of loading data into destination register 415, the cache line having the data may be prefetched into cache memory 416. In one embodiment, the data may first be prefetched into cache memory 416, for example, before being gathered, in order to avoid paying a cache miss penalty. Such an order of operations may be achieved, for example, by executing the following instruction:

vgatherpfd vector_offset{ mask}, [base_address]
  mask may be a 16-bit mask register to track the progress
    of the vector-gather operation base_address may be the
    base memory address
  vector_offset may be a register that contains a vector of
    offsets from the base_address Following is one example or sample of pseudo-code for a prefetch loop:

```
The vgatherpfd may prefetch the data into the L1 cache each iteration.
; K1 = ffff;
    vkxnor k1, k1      ; init the completion mask
vpref_loop:
    ; prefetch the cacheline associated with the first non-gathered element
    vgatherpfd v2{k1}, [eax]
    vkortest k1, k1
    jnz vpref_loop
```

Embodiments of the invention may include gather and/or scatter operations that use mask register 410 as a writemask (e.g., selecting the data elements on which to operate) and completion mask (e.g., signaling or flagging when the operation may be complete). In one embodiment, the writemask and/or vector completion mask may be (e.g., 16 bit) registers in a register file. Such embodiments may enable varied and/or flexible implementations on different architectures with varying levels of performance that may be customized for a target application. For example, some wide vector architectures may implement gather and/or scatter operations in which all elements are gathered and/or scattered in a single cycle. In other implementations may gather and/or scatter only one element per cycle. The order of instructions for executing the gather and/or scatter operations may affect the number of cycles used to access cache memory 416 to scatter and/or gather elements. Embodiments of the invention may use addresses that may be built using scaled index bias addressing, which may allow, for example, for 64-bit address generation from a vector having a 32-bit offsets. Compared with some conventional architectures, which use a vector of completely formed addresses, the scaled addressing may be generated using reduced programming overhead. Addressing modes may be formed using a (e.g., 64-bit) memory pointer using elements from two vector registers and/or neighboring elements in one vector register. Other or different memory pointing or addressing mechanisms may be used.

Embodiments of the invention may include gather and/or scatter operations that support a wide variety of data type conversions. Such support may be valuable when considering the spatial coherency of data and the total number of cache lookups used to complete a scatter and/or gather operation. Other or different benefits may be achieved.

Figure 7:
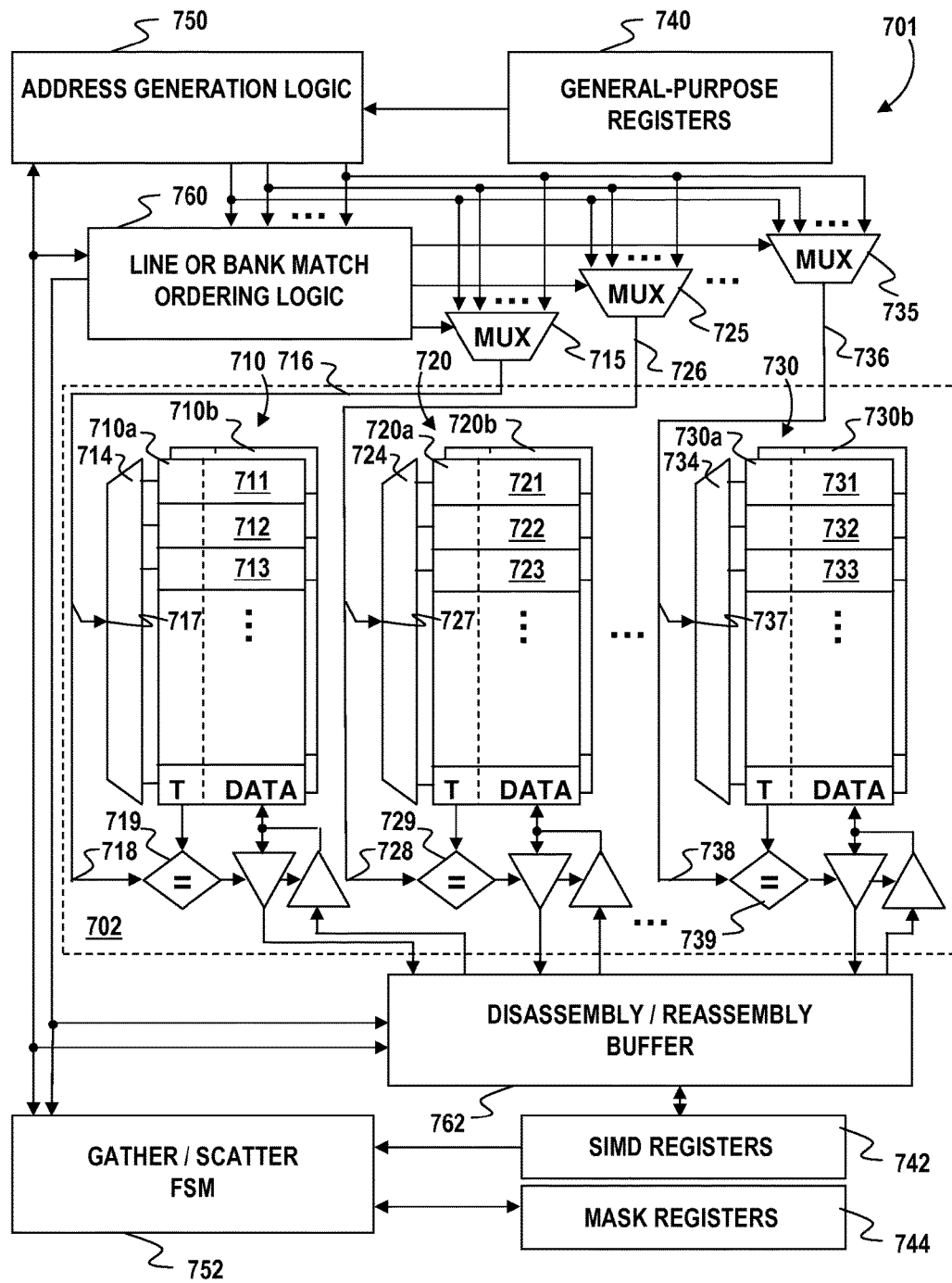
FIG. 7 illustrates one embodiment of an apparatus for accessing multiple data cache lines responsive to, and/or in support of scatter operations.

FIG. 7 illustrates a block diagram for one embodiment of an apparatus 701 to access a cache 702 in support of scatter and/or gather operations. Apparatus 701 may include a gather/scatter finite state machine 752, coupled with mask registers 744 and SIMD registers 742 to control gather operations from a cache 702 or memory, and scatter operations to cache 702 or memory. For one embodiment, address generation logic 750 is coupled with gather/scatter finite state machine 752, and with general purpose registers 740, to generate an address from an index of a set of indices in a SIMD index register, for each of a set of corresponding elements in a mask register having a first value. In one embodiment the mask register is an architecturally visible register in mask registers 744. In another embodiment the mask register may be implicit, for example with all fields initially having the first value indicating that the corresponding element has not been gathered from, or scattered to the cache 702 or memory. For one embodiment, a line or bank match ordering logic 760 is coupled with the gather/scatter finite state machine 752 and address generation logic 750 to match addresses corresponding to a same cache line or to different cache banks, and to order an access sequence to permit a group of addresses in multiple cache lines and different banks. Address selection logic, such as muxes 715, 725 and 735 are coupled with the line or bank match ordering logic 760, to direct the group of addresses to corresponding different cache banks.

Cache 702 is coupled with the address selection logic, to access data elements in multiple cache lines corresponding to the group of addresses in a single access cycle. The cache 702 may be populated by a plurality of cache banks 710, 720, . . . , 730, each of which may be addressed independently of the other to store data in mutually exclusive portions of a cache line. For one embodiment, each bank in the cache 702 may be a set associative cache, but other types of caches may be used. Each bank may also be populated by a plurality of cache entries organized into multiple ways. For simplicity, the example of cache 702 illustrates only two ways, e.g. 710a and 710b for bank 710, 720a and 720b for bank 720, and 730a and 730b for bank 730, etc.; there could be more. Each way 710a, 710b may be populated by a plurality of cache entries (labeled 711, 712, 713, etc. for way 710a, 721, 722, 723, etc. for way 720a, and 731, 732, 733, etc. for way 730a). The cache entries each may include a first field T to store a tag identifier and a second field DATA to store data to be stored to, or retrieved from the cache. The tag may be derived from the address, with which the data stored in the cache line (e.g. 711, 712, 713, etc.) is indexed. The cache 702 may accept separate address signals for each of the banks (e.g. 716, 726 . . . , 736). In the example shown in FIG. 7, address decoders 714, 724, . . . , 734 access the cache lines based upon respective input addressing signals 716, 726, . . . , 736. Each bank 710, 720, . . . , 730 may be addressed independently of the other banks. For one embodiment, a cache line (e.g. 711, 721, . . . , 731) may be addressed by a portion of an address, called a "set," (e.g. 717, 727, . . . , 737).

For each clock cycle, the cache 702 may output data having a width that is determined by the cumulative width of the cache lines of all the banks (710, 720, . . . , 730). As noted, however, different cache lines in each bank may be addressed independently of the other. If two or more data elements are stored in non-overlapping banks, it is possible to retrieve them from the cache 702 during a single clock or cache access cycle.

A bank, e.g. bank 710, may include a plurality of comparators, one provided for each way 710a and 710b of the bank 710. For simplicity, only one comparator (i.e. 719, 729, . . . , 739) per bank (710, 720, . . . , 730) is shown. One input of each comparator may be coupled to the output of the tag field T of the respective way 710a and 710b (e.g. the outputs of 710a, 720a, . . . , 730a are shown). Thus, comparator 719 is shown coupled to the tag field T of the first way 710a in bank 710. A second input of each comparator (i.e. 719, 729, . . . , 739) may be coupled to a common tag input (i.e. 718, 728, . . . , 738) for the bank. Thus, when tag data is retrieved from the ways 710a and 710b of a bank 710, the tag data may be compared with an externally supplied tag address 718. A comparator (i.e. 719, 729, . . . , 739) may generate a "hit" signal if the data on its inputs match each other. Because all tags in the same set in the same bank of a set associative cache must differ, only one of the comparators from the ways 710a and 710b of a bank 710 will generate a match. The "hit" signal may be used to enable data to be read from or written to the cache line of the set addressed by the respective address portion (i.e. 717, 727, . . . , 737) supplied to the bank (710, 720, . . . , 730)

Each bank (710, 720, . . . , 730) of the cache 702 may include an address decoder (i.e. 714, 724, . . . , 734). In response to an applied address signal on its input (i.e. 717, 727, . . . , 737), an address decoder may access a cache entry in each way and cause the contents stored in the respective entry to be retrieved. According to one embodiment, the data supplied to the tag input for each bank may be derived from the respective address signal (i.e. 716, 726, . . . , 736). Thus, although two data elements may have sufficient commonality between their storage addresses to be stored in the same set within the cache 702, their addresses may be sufficiently different to have different tags. Thus, the different ways of the cache structure 702 of FIG. 7 may store different data elements in the same set. A cache having multiple ways is called an "associative cache." Associativity multiplies capacity of a cache linearly with the number of ways in the cache (in this example two). It also contributes to reduce thrashing of data.

A disassembly/reassembly buffer 762 is coupled with the cache 702, with line or bank match ordering logic 760, with the gather/scatter finite state machine 752, and with SIMD registers 742, to order data elements, according to their respective corresponding banks for scatter instructions, or the in-register positions of their corresponding indices for gather instructions. Gather/scatter finite state machine 752 is also coupled with the mask registers 744, to change values of corresponding elements in the mask register from the first value to a second value, indicating that that the corresponding data element does not need to be, or has already been scattered to, or gathered from the cache 702 or memory.

It will be appreciated that embodiments of the present invention permit accessing multiple data elements in a single data cache line, or data elements in different banks (710, 720, . . . , 730) in multiple data cache lines (e.g. 711, 722, 733, etc.) responsive to, and/or in support of scatter and/or gather operations, thereby permitting improved instruction throughput.

Figure 8:
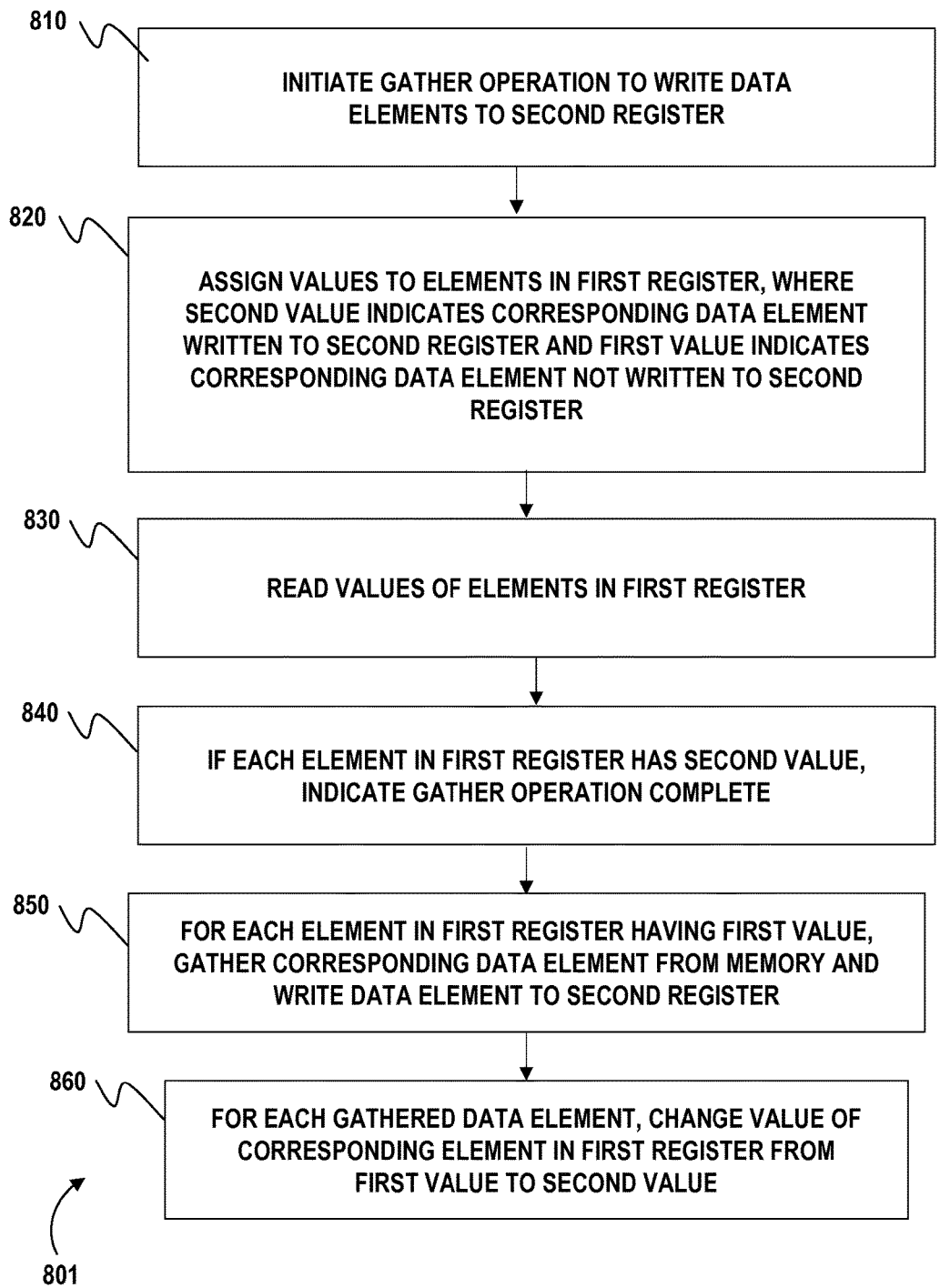
FIG. 8 illustrates a flow diagram for one embodiment of a process to support gather operations.

FIG. 8 illustrates a flow diagram for one embodiment of a process 801 to support gather operations. Process 801 and other processes herein disclosed are performed by processing blocks that may comprise dedicated hardware or software or firmware operation codes executable by general purpose machines or by special purpose machines or by a combination of both.

In processing block 810, a processor (e.g., processor 140 and 160, described in reference to FIG. 1 and processor 270 and 280, described in reference to FIG. 2) may call or initiate a gather operation or instruction, or restart such an operation, to write a set of data elements (e.g., or data elements in a predetermined set of data), and/or pointers thereto, stored for example in two or more noncontiguous memory locations (e.g., memory locations 422 and 424, described in reference to FIG. 4), to a second register.

In processing block 820, the processor may assign values to elements in a first (e.g., a mask) register, which may in some cases monitor the storage capacity of the second register. In some embodiments, each element in the first register may correspond to a respective one of the data elements to be written into the second (e.g., load) register. There may be a one-to-one correspondence between data fields in the first register and data elements in the second register. A second value may indicate that the corresponding data element has been written into the second register and a first value may indicate that the corresponding element has not been written into the second register. The second value may be zero (0) and the first value may be one (1). In another embodiment, the second value may be one (1) and the first value may be zero (0). Other or different values may be used.

In some embodiments, each zero value of an element (e.g., a state element) in a mask register may indicate that the corresponding data element has been written to a load register and each nonzero value of the state element in the mask register may indicate that the corresponding data element has not been written to the load register.

In processing block 830, the processor may read the values of each of the elements in the first register. In processing block 840, if each element in the first register has the second value, the first register may indicate (e.g., using a flag or signal) that a gather operation for writing each corresponding data element into the second register is complete. For example, the processor may complete the gather operation if the first register indicates that all data elements have been written into the second register. In one embodiment, the processor may sum each of the values of each of the elements in the first register, and if the sum is equal to a predetermined threshold (e.g., zero (0)), the first register may indicate that a gather operation is complete. In one embodiment, a predetermined threshold of zero may be used for the first register to monitor the storage capacity of the second register of any size, or the progress of a gather operation. For example, writing or gathering may stop when all elements of the first register are zero, the sum of the elements of the first register is zero, and/or the first register is empty.

In processing block 850, for each element in the first register having the first value, the processor may gather the corresponding data element from memory and write the data element into the second register. In one embodiment, for each element in the first register having a first value, the processor may write a maximal number of data elements to be gathered from a memory location (e.g., a cache line) to the second register. For example, for each nonzero state element, if a cache line holding the corresponding data element comprises a second data element to be gathered (e.g., from the predetermined set), the processor may write the second data element to the load register. In some embodiments, when a page fault occurs, the processor may read a data element from external memory.

In some embodiments, for each element in a mask register having a nonzero value read (e.g., in operation 830), the processor may write each of the corresponding data elements from memory to a load register until the total value (e.g., the sum of values of each element) of the mask register is zero.

In processing block 860, for each gathered data element, the processor may change the value of the corresponding element in the first register from the first value to the second value. Other operations or series of operations may be used.

Figure 9:
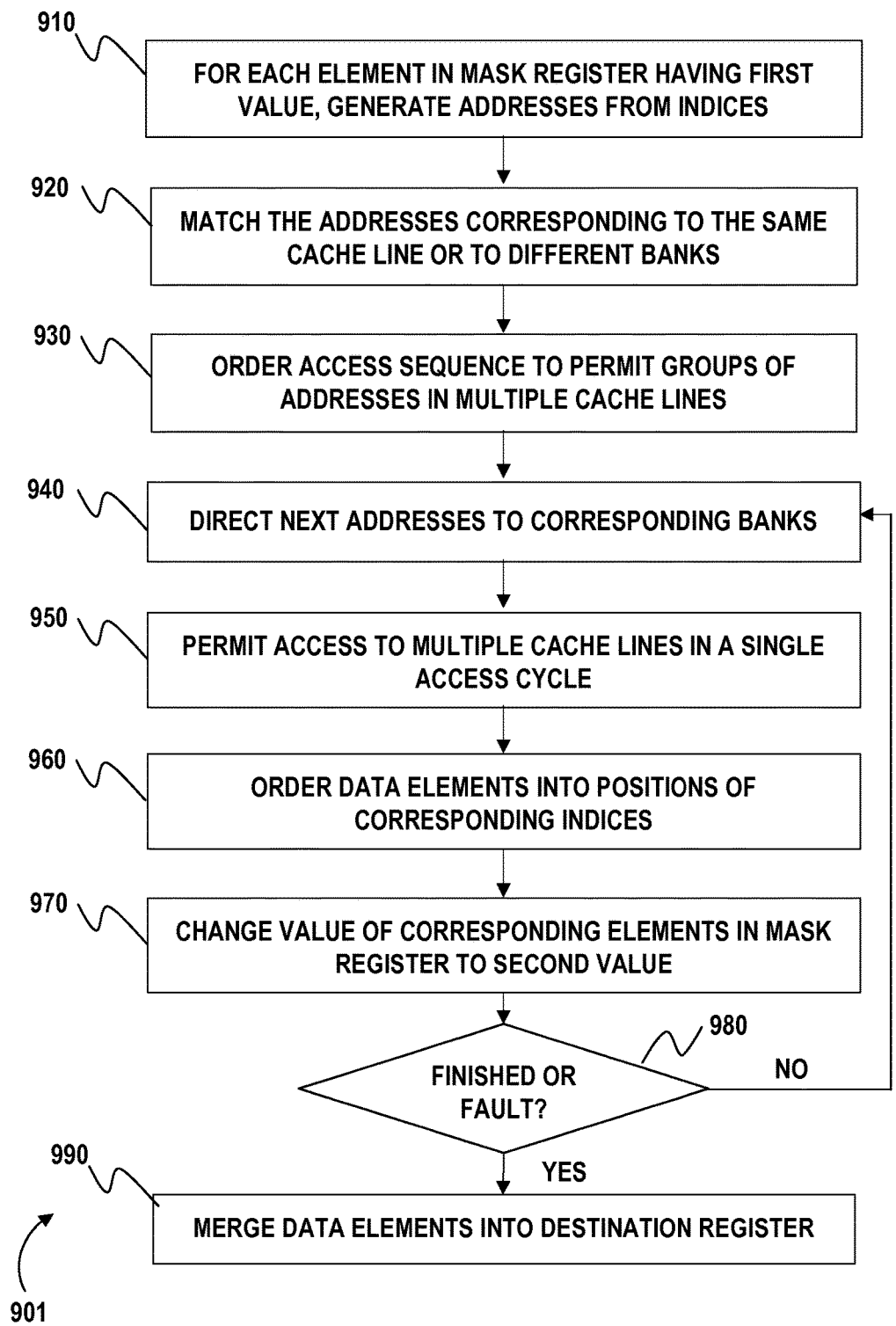
FIG. 9 illustrates a flow diagram for an alternative embodiment of a process to support gather operations.

FIG. 9 illustrates a flow diagram for an alternative embodiment of a process 901 to support gather operations. In processing block 910 an address is generated from an index of a set of indices in a first SIMD register (e.g. by address generation logic 750), for each of a set of corresponding elements in a mask register having a first value. In processing block 920 addresses corresponding to a same cache line or to different banks are matched (e.g. by line or bank match ordering logic 760), and an access sequence is ordered in processing block 930 to permit groups of addresses in multiple cache lines and different banks. In processing block 940 the next group of addresses are to direct to their corresponding banks (e.g. by address selection logic such as muxes 715, 725 and 735). Processing proceeds to processing block 950 where access to multiple data elements, in a single access cycle, and in multiple cache lines corresponding to the group of addresses is permitted (e.g. by cache 702). In processing block 960 the multiple data elements are ordered according to positions of their corresponding indices in the first SIMD register (e.g. by disassembly/reassembly buffer 762). Upon successful completion of gathering the data elements into the disassembly/reassembly buffer, the values of corresponding elements in the mask register are changed in processing block 970 from the first value to a second value (e.g. by gather/scatter finite state machine 752). In processing block 980, if the gather instruction is finished or a fault occurs, processing proceeds to processing block 990 where the gathered data elements are merged into a SIMD desination register. Otherwise, processing reiterates beginning in processing block 940 until all the data elements, corresponding to the set of elements in the mask register of the first value, have been gathered into the disassembly/reassembly buffer.

Figure 10:
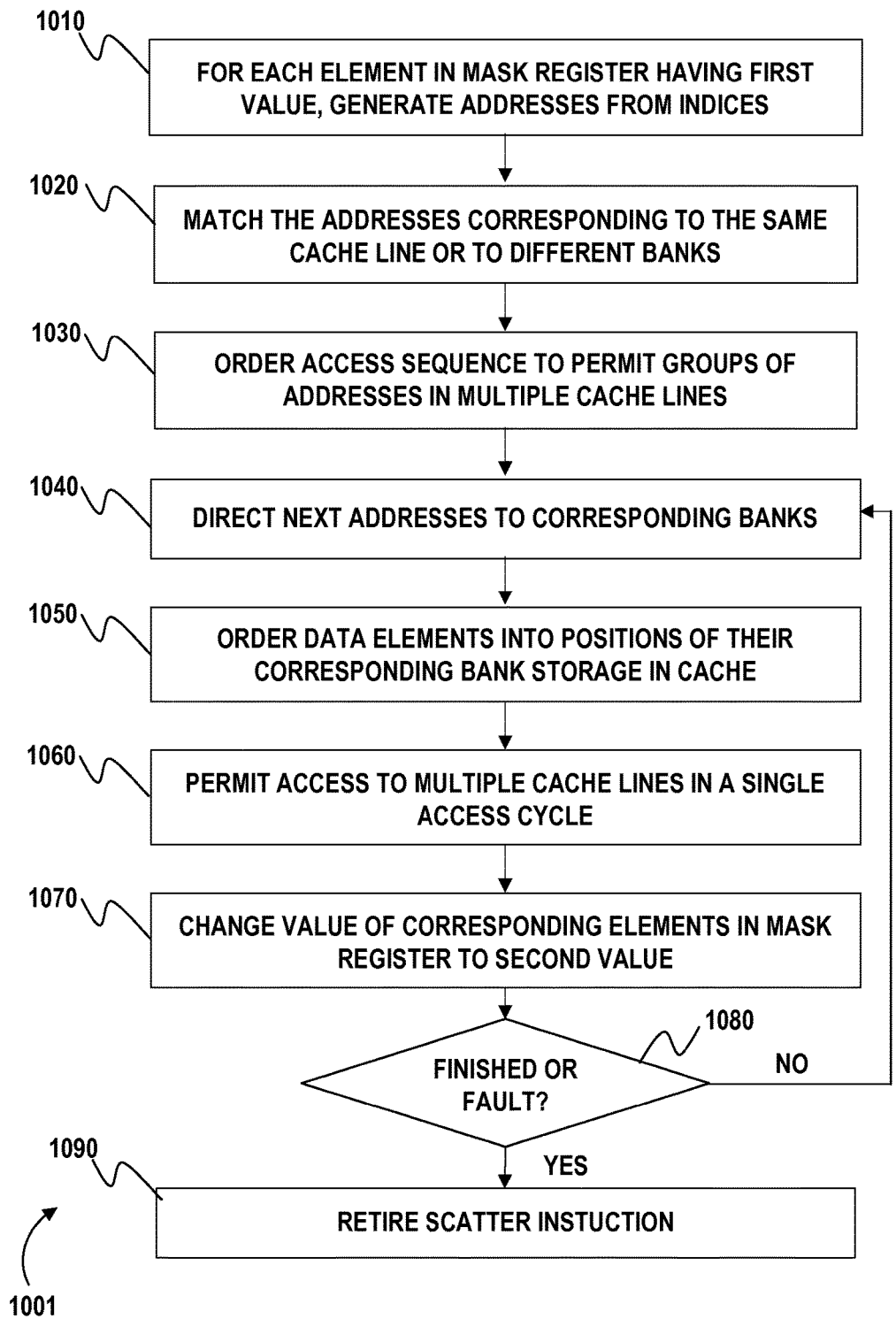
FIG. 10 illustrates a flow diagram for one embodiment of a process to support scatter operations.

FIG. 10 illustrates a flow diagram for an alternative embodiment 1001 of a process to support scatter operations. In processing block 1010 an address is generated from an index of a set of indices in a first SIMD register (e.g. by address generation logic 750), for each of a set of corresponding elements in a mask register having a first value. In one embodiment the mask register is an architecturally visible register. In another embodiment the mask register may be implicit, for example with all fields initially having the first value indicating that the corresponding element has not been scattered to the memory. In processing block 1020 addresses corresponding to a same cache line or to different banks are matched (e.g. by line or bank match ordering logic 760), and an access sequence is ordered in processing block 1030 to permit groups of addresses in multiple cache lines and different banks. In processing block 1040 the next group of addresses are to direct to their corresponding banks (e.g. by address selection logic such as muxes 715, 725 and 735). Processing proceeds to processing block 1050 where the multiple data elements are ordered according to their corresponding bank storage positions in cache (e.g. by disassembly/reassembly buffer 762). In processing block 1060 access to multiple data elements, in a single access cycle, and in multiple cache lines corresponding to the group of addresses is permitted (e.g. by cache 702). Upon successful completion of scattering the data elements from the disassembly/reassembly buffer into cache, the values of corresponding elements in the mask register are changed in processing block 1070 from the first value to a second value (e.g. by gather/scatter finite state machine 752). In processing block 1080, if the scatter instruction is finished or a fault occurs, processing proceeds to processing block 1090 where the scatter instruction is retired (e.g. by retirements stage 320). Otherwise, processing reiterates beginning in processing block 1040 until all the data elements, corresponding to the set of elements in the mask register of the first value, have been scattered into the cache or to memory.

It will be appreciated that embodiments of the present invention permit accessing multiple data elements in a single data cache line, or data elements in different banks in multiple data cache lines responsive to, and/or in support of scatter and/or gather operations, thereby permitting improved instruction throughput.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A processor comprising:
a cache memory having a plurality of banks to store data in mutually exclusive portions of a cache line;
a first register comprising a plurality of data fields, wherein the plurality of data fields in the first register corresponds to a plurality of data elements accessible using a plurality of corresponding indices in a second register, wherein for each data field in the first register, a first value indicates the corresponding data element has not been accessed and a second value indicates that the corresponding data element does not need to be, or has already been, accessed using a corresponding index from the second register;
a decode stage to decode a first instruction; and
one or more execution units, responsive to the decoded first instruction, to:
read the values of each of the plurality of data fields in the first register;
for two or more of the plurality of data fields in the first register having the first value, determine a first pair of corresponding data elements stored in different banks of the cache memory, and simultaneously access the first pair of corresponding data elements in said different banks using their corresponding indices; and
change the values of a pair of data fields in the first register corresponding to said first pair of corresponding data elements from the first value to the second value.

2. The processor of claim 1 wherein said simultaneously accessing the first pair of corresponding data elements means gathering the first pair of corresponding data elements from said different banks in a single cache access.

3. The processor of claim 1 wherein said simultaneously accessing the first pair of corresponding data elements means scattering the first pair of corresponding data elements to said different banks in a single cache access.

4. A processor comprising:
a cache memory having a plurality of banks to store data in mutually exclusive portions of a cache line;
a first register comprising data fields, wherein each data field in the first register corresponds to a data element to be written into a second register, wherein for each data field in the first register, a first value is to indicate the corresponding data element has not been written into the second register and a second value is to indicate that the corresponding data element does not need to be, or has already been, written into the second register;
a decode stage to decode a first instruction; and
one or more execution units, responsive to the decoded first instruction, to:
read the values of each of the data fields in the first register;
for a plurality of data fields in the first register having the first value, determine a first pair of corresponding data elements stored in different banks of the cache memory, and access said different banks using a second pair of addresses, corresponding to said first pair of corresponding data elements, to gather the first pair of corresponding data elements and write the first pair of corresponding data elements into the second register; and change the values of a third pair of data fields in the first register, corresponding to said first pair of corresponding data elements, from the first value to the second value.

5. The processor of claim 4 further comprising: a disassembly/reassembly buffer, coupled with the cache memory and with the second register, to order the first pair of corresponding data elements according to the respective positions of the third pair of data fields in the first register to be merged into the second register.

6. The processor of claim 4 further comprising:
line or bank match ordering circuitry to match the second pair of addresses corresponding to different banks to determine the first pair of corresponding data elements.

7. A method comprising:
decoding a first instruction; and
executing the decoded first instruction, to:
read values of each of a plurality of data fields in a first register, wherein the plurality of data fields in the first register corresponds to a plurality of data elements accessible using a plurality of corresponding indices in a second register, wherein for each data field in the first register, a first value indicates the corresponding data element has not been accessed and a second value indicates that the corresponding data element does not need to be, or has already been, accessed using a corresponding index from the second register,
for two or more of the plurality of data fields in the first register having the first value, determine a first pair of corresponding data elements stored in different banks of a cache memory having a plurality of banks to store data in mutually exclusive portions of a cache line, and simultaneously access the first pair of corresponding data elements in said different banks using their corresponding indices; and
change the values of a pair of data fields in the first register corresponding to said first pair of corresponding data elements from the first value to the second value.

8. The method of claim 7 wherein said simultaneously accessing the first pair of corresponding data elements means gathering the first pair of corresponding data elements from said different banks in a single cache access.

9. The method of claim 7 wherein said simultaneously accessing the first pair of corresponding data elements means scattering the first pair of corresponding data elements to said different banks in a single cache access.

10. A method comprising:
decoding a first instruction; and
executing the decoded first instruction, to:
read values of each data field in a first register, wherein each data field in the first register corresponds to a data element to be written into a second register, wherein for each data field in the first register, a first value indicates the corresponding data element has not been written into the second register and a second value indicates that the corresponding data element does not need to be, or has already been, written into the second register,
for a plurality of data fields in the first register having the first value, determine a first pair of corresponding data elements stored in different banks of a cache memory having a plurality of banks to store data in mutually exclusive portions of a cache line, and access said different banks using a second pair of addresses, corresponding to said first pair of corresponding data elements, to gather the first pair of corresponding data elements and write the first pair of corresponding data element into the second register; and
change the values of a third pair of data fields in the first register, corresponding to said first pair of corresponding data elements, from the first value to the second value.

11. The method of claim 10 further comprising:
ordering the first pair of corresponding data elements according to the respective positions of the third pair of data fields in the first register to be merged into the second register.

12. The method of claim 10 further comprising:
matching the second pair of addresses corresponding to different banks to determine the first pair of corresponding data elements.

* * * * *